United States Patent Office 3,605,930
Patented Sept. 20, 1971

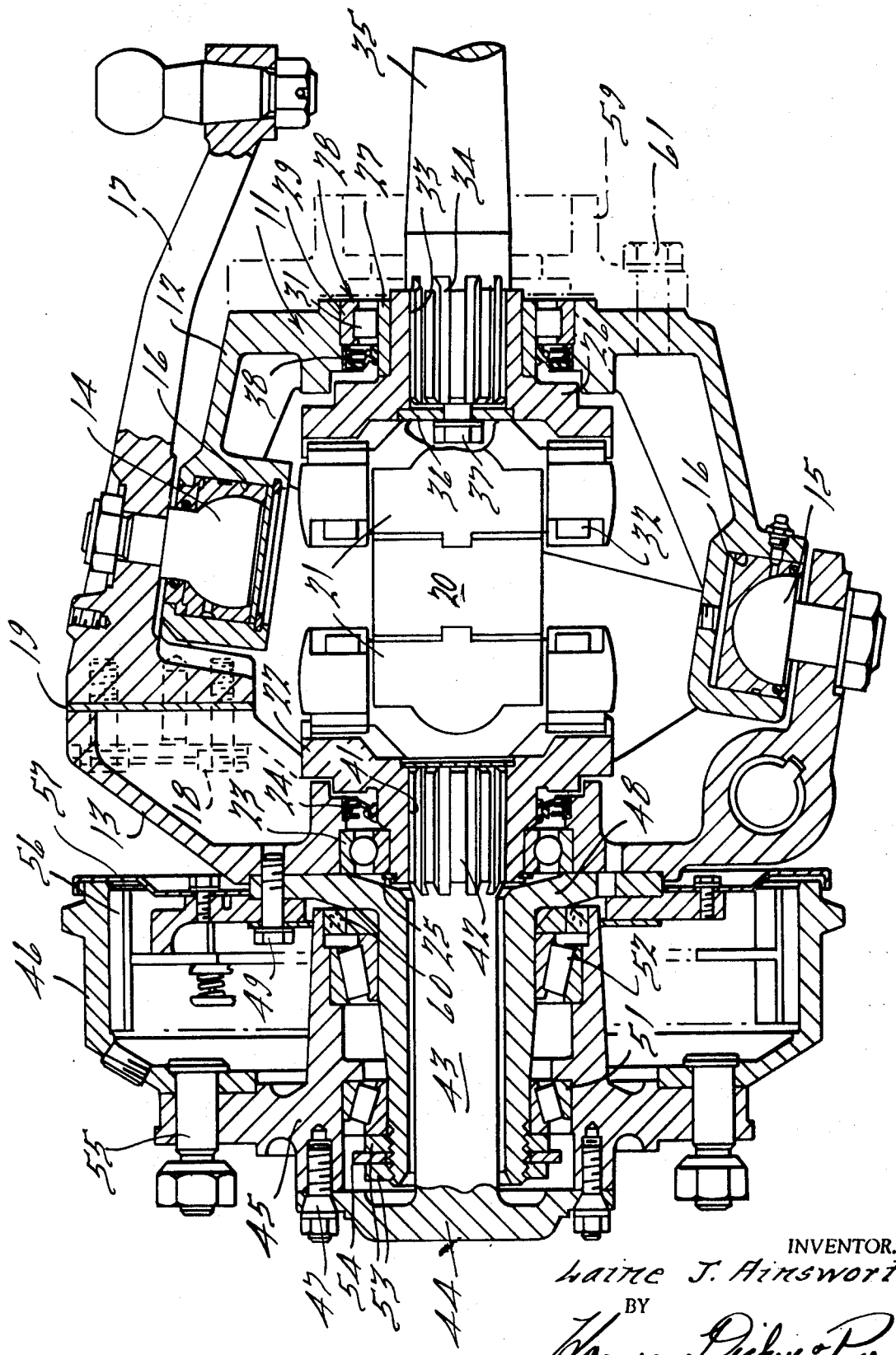

3,605,930
STEERABLE DRIVING AXLE
Laine J. Ainsworth, Oakland, Calif., assignor to
Kelsey-Hayes Company
Filed Nov. 26, 1968, Ser. No. 778,991
Int. Cl. B60k 17/30
U.S. Cl. 180—43R                                6 Claims

ABSTRACT OF THE DISCLOSURE

The steerable driving axle is driven through a double cardan universal joint suspended inside a steerable drive with the outer end fixed and the inner end movable within a roller bearing carried by the inner suspension member. This arrangement positions the universal joint and permits the removal of the outer driven axle and its replacement in the located end of the joint.

BACKGROUND OF THE INVENTION

Reference may be had to Patent No. 3,253,670 assigned to a division of the assignee company of the present invention for a similar type of steerable driving axle over which the present invention is an improvement.

SUMMARY OF THE INVENTION

The invention pertains to a compact steerable driving axle from which the outer driven axle may be readily removed. After this the wheel, hub and brake drum may also be removed so that all the wheel bearings and other moving parts can be packed with a lubricant without any change in the position of the universal joint. The outer driven shaft has a spline which extends into a spline in a yoke on the outer end of a double cardan universal joint. The inner yoke on the opposite end of the joint is movable within a roller bearing mounted in the inner support member for the drive. The inner driving axle is splined to extend within the splined aperture in the inner yoke of the universal joint and is bolted thereto for movement therewith so that the axial movement of the joint occurs within the splined connection of the inner end of the inner driving axle. Ball-type kingpins are provided above and below the universal joint for connecting the inner and outer supporting elements, the upper ball-type kingpin being connected to a steerable arm by which the wheel is steered about the kingpin axis. The arm is joined to the front supporting member by screws with shims therebetween by which the camber of the wheel can be changed.

BRIEF DESCRIPTION OF THE DRAWING

The figure is a broken sectional view of a steerable driving axle embodying features of the present invention.

DESCRIPTION OF THE PREFERRED EMBODIMENT

The steerable driving axle 11 has an inner supporting member 12 and an outer supporting member 13 with ball-type kingpins 14 and 15 joining the two members together. The ball-type kingpins and the assembly thereof in recesses 16 in the inner supporting member 12 are similar to that illustrated and described in the above mentioned patent. A steering arm 17 on the outer supporting member 13 to which the upper ball-type kingpin 14 is secured is a separate element attached to the member 13 by a plurality of screws 18. Shims 19 located between the arm 17 and member 13 provide the desired camber to the wheel supported by the outer member 13.

Two cardan universal joints 21 have a spacer block 20 therebetween through the center of which the centerline of the ball joints 14 and 15 passes. The joint 21 has its outer yoke 22 journaled in a bearing 23 supported in the outer supporting member 13 and sealed thereto by a seal 24. A split ring 25 secures the yoke in axial fixed relation to the bearing 23 and the supporting member 13. An inner yoke 26 on the opposite inner joint 2 has an elongated sleeve 27 secured thereto. The sleeve 27 forms the inner race of a roller bearing 28 having an outer race 29 which encompasses rollers 31 which engage the sleeve 27 which is movable axially relative thereto. It will be noted that the yoke is spaced from the inner member 12 sufficiently to permit the axial movement required for the operation of the universal joint 21 during the driving and steering of the wheel. The elements of the universal joint are connected together in the usual manner by a plurality of screws 32. The inner yoke 26 has a splined aperture 33 which receives a spline end 34 of an inner driving axle 35. The opposite end of the axle 35 has a spline which engages a spline in the driving member for axial movement relative thereto. The inner end of the splined end 34 of the driving axle 35 abuts a washer 36 within the yoke 26 and is secured in fixed relation thereto by a screw 37. The movement within the universal joint 21 will be permitted by the axial movement of the yoke 26 and the drive axle 35 by the sliding of the sleeve 27 lengthwise of the rollers 31 which are sealed by a sealing element 38.

The yoke 22 supported by the outer member 13 has a splined aperture 41 for receiving a splined end 42 of an outer driven axle 43. The axle 43 has a mushroom head 44 which is secured to a wheel hub 45 by screws 47. A wheel hub supporting spindle 48 is secured to the outer supporting member 13 by a plurality of screws 49. Thrust-type roller bearings 51 and 52 carried in the wheel hub 45 are secured to the wheel hub supporting spindle 48 by a pair of nuts 53 with a locking washer 54 therebetween. The brake drum 46 is attached to the hub at either an inner or outer mounting face thereof by separate screws or by wheel mounting studs 55 extending outwardly therefrom. Brake shoes 56 of conventional form are located within the brake drum 46 and enclosed by a dust plate 57. The wheel hub 45 is sealed to the spindle 48 by a sealing element 60.

The inner axle 35 drives through the universal joint 21 to drive the outer axle 43, the wheel hub 45 and the brake drum along with the wheel secured to the wheel hub and brake drum on the studs 55. When the operating arm 17 is moved the axle 43 is angularly displaced causing movement in the universal joint 21. Since the yoke 22 is fixed against longitudinal movement, the yoke 26 will move relative to the inner supported member 12 moving the driving shaft 35 axially therewith. This movement is made possible by lengthening the sleeve 27 relative to the rollers 31 which permits its movement lengthwise relative thereto. The outer race 29 of the bearing 28 is supported in the end of the inner supporting member 12 against the face of an axle housing 59 to which the member 12 is secured by a plurality of screws 61. The elements of the universal joint are retained in predetermined relation to each other with the yoke 22 in fixed relation to the bearing 23 so that the axle 43 may be removed from and inserted within the aperture 41 of the yoke without any displacement thereof. This removal is made possible by the removal of the screws 47 which permits the nuts 53 to be removed so that the hub 45 and drum along with the bearings 51 and 52 may be slid from the wheel supporting spindle 48. This permits the bearings to be packed with a lubricant and replaced on the wheel supporting spindle with the axle 43 assembled in driving position, as illustrated in the figure.

I claim:
1. In a steerable driven axle, an inner and outer supporting member joined together by ball-type kingpins having their centerline disposed at an angle to the centerline of the axle, a double universal joint having a yoke at the inner and outer ends provided with a boss having a spined aperture, a spacer block between said yokes, an outer bearing supported by said outer supporting member into which the boss of said outer yoke extends, an inner bearing supported by the inner supporting member into which the boss of said inner yoke extends, said double universal joint being confined within said inner and outer supporting members with the center of the spacer block located substantially on the centerline through said ball-type kingpins, and means for axially fixing the boss of the outer yoke within its bearing member while the boss of the inner yoke is axially movable within its bearing member.

2. In a steerable driven axle as recited in claim 1, wherein a driving axle having a splined end extends into the splined boss of the inner yoke, and means for securing the driving axle in fixed relation to said inner yoke.

3. In a steerable driven axle as recited in claim 1, wherein the inner bearing has an inner and outer race with rollers therebetween, said inner race being elongated and secured to said inner yoke to permit the movement of the inner race transverse of said outer race when the inner yoke is axially moved.

4. In a steerable driven axle as recited in claim 1, wherein the bearing for the inner yoke is of the roller type having an inner and outer race with rollers therebetween, the inner race being fixed to the boss of said inner yoke for axial movement on said rollers.

5. In a steerable driven axle as recited in claim 3, wherein confining means retain said rollers against axial movement relative to said outer race.

6. In a steerable driven axle as recited in claim 1, wherein a driving axle having a splined end extending into the splined aperture in the boss of the inner yoke, a driven axle having a splined end extending into the splined aperture in the boss of the outer yoke and driven through said double universal joint by said driving axle and means for securing the associated axle and said inner yoke for conjoint movement.

References Cited

UNITED STATES PATENTS

| 2,917,123 | 12/1959 | Ainsworth | 180—43 |
| 3,253,670 | 5/1966 | Thomas et al. | 180—43 |
| 3,385,081 | 5/1968 | Wier | 180—43X |
| 3,472,331 | 10/1969 | Baker et al. | 180—43 |

FOREIGN PATENTS

| 517,465 | 1/1940 | Great Britain | 180—43 |

A. HARRY LEVY, Primary Examiner